US010795628B2

(12) United States Patent
Tokiwa

(10) Patent No.: US 10,795,628 B2
(45) Date of Patent: Oct. 6, 2020

(54) INFORMATION PROCESSING SYSTEM, INFORMATION PROCESSING APPARATUS, AND LOG INFORMATION MANAGEMENT METHOD

(71) Applicant: Masafumi Tokiwa, Fukuoka (JP)

(72) Inventor: Masafumi Tokiwa, Fukuoka (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 16/697,892

(22) Filed: Nov. 27, 2019

(65) Prior Publication Data

US 2020/0174730 A1 Jun. 4, 2020

(30) Foreign Application Priority Data

Nov. 29, 2018 (JP) .................. 2018-223195

(51) Int. Cl.
*G06F 3/12* (2006.01)

(52) U.S. Cl.
CPC ............ *G06F 3/1275* (2013.01); *G06F 3/121* (2013.01); *G06F 3/1207* (2013.01); *G06F 3/1273* (2013.01)

(58) Field of Classification Search
CPC ...... G06F 3/1275; G06F 3/121; G06F 3/1207; G06F 3/1273
See application file for complete search history.

(56) References Cited

U.S. PATENT DOCUMENTS

| 9,875,068 | B2 | 1/2018 | Tokiwa |
| 9,876,918 | B2 | 1/2018 | Tokiwa et al. |
| 10,182,169 | B2 | 1/2019 | Tokiwa et al. |
| 10,375,142 | B2 | 8/2019 | Tokiwa |
| 2016/0366234 | A1 | 12/2016 | Tokiwa |
| 2018/0198930 | A1 | 7/2018 | Tokiwa et al. |

FOREIGN PATENT DOCUMENTS

| JP | 2016-146137 | 8/2016 |
| JP | 2019-161609 | 9/2019 |

*Primary Examiner* — Christopher Wait
(74) *Attorney, Agent, or Firm* — IPUSA, PLLC

(57) ABSTRACT

There is provision of an information processing system including a first information processing apparatus on a first network and a second information processing apparatus on a second network different from the first network. The first and second information processing apparatuses are configured to perform a first job and a second job respectively. The first information processing apparatus is configured to issue unique identification information to a job that has issued an identification information issuance request. The first information processing apparatus adds first identification information to log information of the first job, and stores the log information to which the first identification information is added. The second information processing apparatus adds second identification information to log information of the second job, and transmits the log information to which the second identification information is added to the first information processing apparatus.

8 Claims, 15 Drawing Sheets

FIG.9

ERROR DETAIL

START DATE/TIME  
2018/08/20 13:17:06

END DATE/TIME  
2018/08/20 13:17:10

STATUS  
ERROR

ERROR MESSAGE  
An error has occurred during execution of APP. Please contact the system administrator.
An unknown error has occurred during execution. Please restart after a time.
If nothing has been improved, please contact the system administrator.

JOB ID  
0000-0001

[ CLOSE ]

| JOB ID | EXECUTION ENVIRONMENT | STATUS | START DATE/TIME | END DATE/TIME | SERIAL NUMBER | ERROR MESSAGE |
|---|---|---|---|---|---|---|
| 0000-0001 | on-premises | error | 2018/08/20 13:17:06 | 2018/08/20 13:17:10 | 11111111 | An error has occurred during execution··· |
| 0000-0002 | cloud | error | 2018/08/20 15:09:57 | 2018/08/20 15:10:01 | 11111112 | An error has occurred during execution··· |
| 0000-0003 | on-premises | completed | 2018/08/20 15:10:21 | 2018/08/20 15:10:24 | 11111111 | |
| ··· | | | | | | |

FIG.12

```
{
"apiResult" : "400",
"apiUrl" : "https://example.com/",
"appVersion" : "1.0.0",
"errorMessage" : "[¥" errors¥":[[¥" message_id¥":¥"io.invalid_params¥"]]]",
"level" : "[WARN]",
"serialId" : "11111111",
"jobId: "0000-0001",
"@timestamp" : "2018-08-24T00:55:16+00:00"
}
```

FIG.14

| JOB ID | EXECUTION ENVIRONMENT | STATUS | START DATE/TIME | END DATE/TIME | DEPENDENT JOB ID | SERIAL NUMBER | ERROR MESSAGE |
|---|---|---|---|---|---|---|---|
| 1000-0001 | on-premises | completed | 2018/08/21 13:17:06 | 2018/08/21 13:20:04 | 1000-0002 | 11111111 | |
| 1000-0002 | cloud | completed | 2018/08/21 13:17:25 | 2018/08/21 13:19:20 | | 11111111 | |
| 1000-0003 | cloud | error | 2018/08/21 14:17:20 | 2018/08/21 14:17:25 | | 11111112 | An error has occurred during execution···· |
| ... | | | | | | | |

FIG.15

| APPLICATION | WORKFLOW INFORMATION |
|---|---|
| app1 | flow1 |
| app2 | flow2 |
| ⋮ | ⋮ |

INFORMATION PROCESSING SYSTEM, INFORMATION PROCESSING APPARATUS, AND LOG INFORMATION MANAGEMENT METHOD

CROSS-REFERENCE TO RELATED APPLICATION

The present application claims priority under 35 U.S.C. § 119 to Japanese Patent Application No. 2018-223195, filed on Nov. 29, 2018, the contents of which are incorporated herein by reference in their entirety.

BACKGROUND OF THE INVENTION

1. Field of the Invention

The present disclosure relates to an information processing system, and a method of managing log information.

2. Description of the Related Art

Recently, in the execution of a workflow including a series of processes, an on-premises workflow that is executed, from an image forming apparatus, using an apparatus within an on-premises environment other than an image forming apparatus has been utilized. For example, some servers on a cloud computing environment acquire information such as errors from multiple image forming devices that execute on-premises workflows.

There is known a conventional technique in which a public printing server issues a reservation ID, and in which a user prints on a public printer under management of the public printing server by presenting the reservation ID, which enables a usage charge of an image processing device outside an organization, which is used by a user in the organization, to be reflected to a charge management apparatus in the organization (see, for example, Patent Document 1).

Log information for workflow jobs executed in different environments, such as on-premises workflow jobs executed in an on-premises environment and cloud workflow jobs executed in a cloud environment, may be managed collectively in a cloud environment. However, in order to manage job log information in a cloud environment in which workflows run in different environments, a mechanism to uniquely identify job log information is required.

CITATION LIST

Patent Literature

[Patent Document 1] Japanese Unexamined Patent Application Publication No. 2016-146137

SUMMARY OF THE INVENTION

According to an embodiment of the present invention, an information processing system including a first information processing apparatus on a first network and a second information processing apparatus on a second network different from the first network is provided. The first information processing apparatus and the second information processing apparatus are configured to perform a first job and a second job respectively. The first information processing apparatus is configured to issue first identification information to the first job, in response to receiving an identification information issuance request from the first job, and to issue second identification information that is different from the first identification information to the second job, in response to receiving the identification information issuance request from the second job. The first information processing apparatus generates first log information of the first job, adds the first identification information to the first log information, and stores the first log information to which the first identification information is added. The second information processing apparatus generates second log information of the second job, adds the second identification information to the second log information; and transmits the second log information to which the second identification information is added, to the first information processing apparatus.

BRIEF DESCRIPTION OF THE DRAWINGS

FIG. 9 is a diagram illustrating an example of a job log detail screen;

FIG. 10 is a diagram illustrating an example of a job log managed by a log information management unit;

FIG. 12 is a diagram illustrating an example of a configuration of debug log;

FIG. 14 is a diagram illustrating an example of another job log managed by the log information management unit; and FIG. 15 is a configuration diagram illustrating an example of workflow information.

DESCRIPTION OF THE EMBODIMENTS

Hereinafter, embodiments of the present invention will be described with reference to the drawings.

First Embodiment

Figure 1:
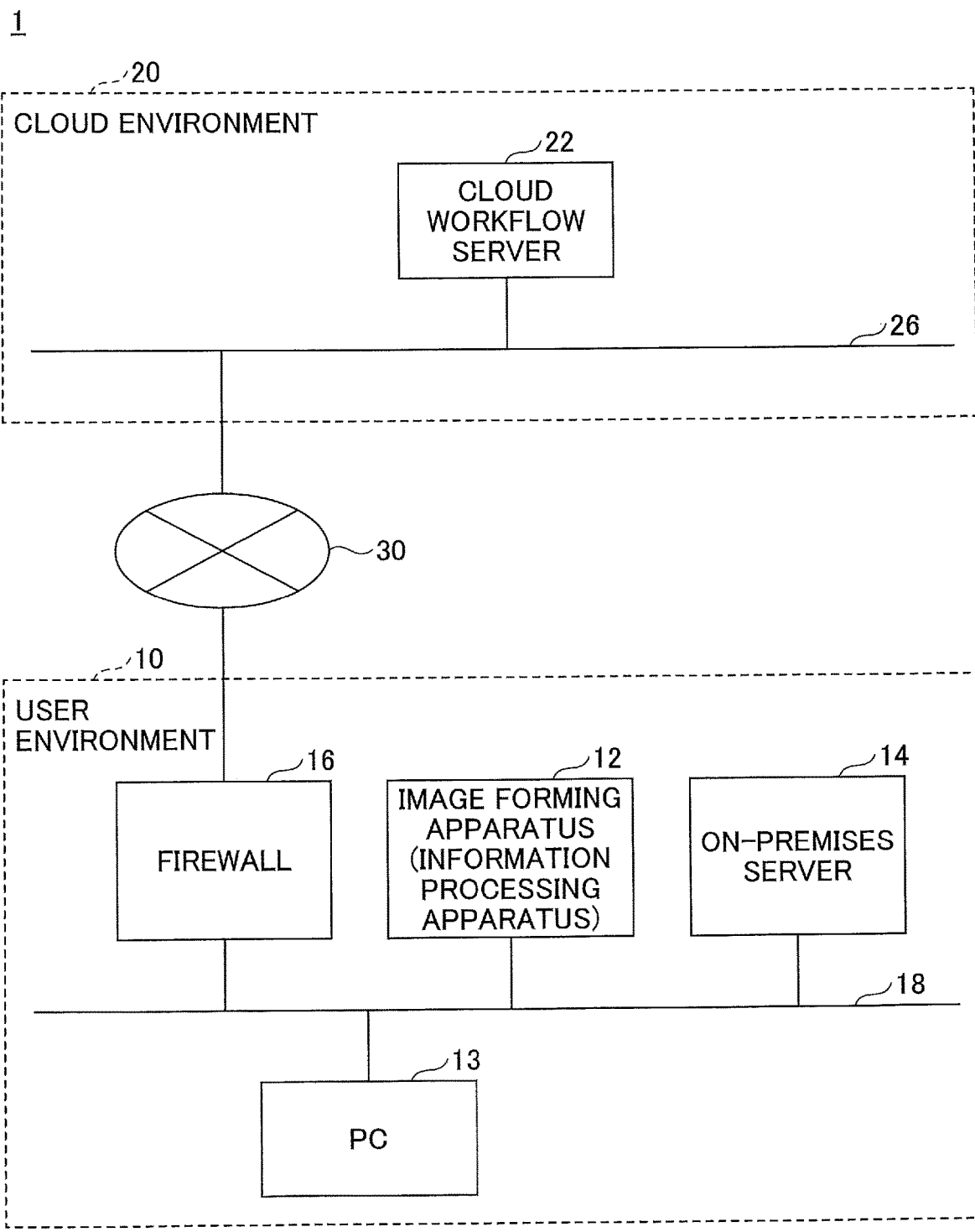
FIG. 1 is a configuration diagram illustrating an example of an information processing system according to an embodiment.

<System Configuration>
First, a system configuration of an information processing system 1 according to a first embodiment will be described with reference to FIG. 1. FIG. 1 is a configuration diagram illustrating an example of the information processing system according to the present embodiment.

The information processing system 1 illustrated in FIG. 1 includes a computer system in a user environment 10 and a computer system in a cloud environment 20 each of which are communicably connected with each other via a network 30 such as the Internet. The information processing system 1 executes a job of a workflow (may also be referred to as a workflow job) composed of one or more processes on at least either the user environment 10 or the cloud environment 20.

The workflow means a series of processes such as sending a scanned image in accordance with a server message block (SMB) protocol, and sending a stamped PDF (Portable Document Format) file embedding an OCR (Optical Character Recognition) text in accordance with a file transfer protocol (FTP). The workflow may handle other than scanned images and may be a series of processes such as stamping and printing a file transmitted in accordance with FTP.

The cloud environment 20 includes a cloud workflow server 22 and a network 26 (may also be referred to as a "first network"). The cloud workflow server 22 is implemented by executing various programs by one or more computers. The cloud workflow server 22 is connected to the network 26 of the cloud environment 20, and is connected to the network 30 (may also be referred to as a "third network") via the network 26. The cloud workflow server 22 runs a workflow job (cloud workflow) of the cloud environment 20.

In addition, the cloud workflow server 22 manages information and status (log information) about execution of a cloud workflow job in the cloud environment 20, and about execution of the workflow (on-premises workflow) in the user environment 10.

The user environment 10 in FIG. 1 includes an image forming apparatus 12, a PC (personal computer) 13, an on-premises server 14, a firewall 16, and a network 18 (may also be referred to as a "second network"). In FIG. 1, each of the image forming apparatus 12, the PC 13, the on-premises server 14, and a firewall 16 is connected to the same network 18 in the user environment 10. As the network 18 is connected to the network 30 via the firewall 16, each device (such as the on-premises server 14) in the user environment 10 can communicate with the cloud workflow server 22 on the network 26 via the firewall 16 and the network 30.

Note that, in the present specification, networks that are separated from each other (access restricted) by a firewall are referred to as "different networks". With respect to the information processing system 1 according to the present embodiment, because the firewall 16 is deployed in the user environment 10, communication between a device (such as the cloud workflow server 22) on the network 26 (cloud environment 20) and a device (such as the on-premises server 14) on the network 18 (user environment 10) is restricted. Thus, the network 18 and the network 26 are different networks from each other.

The image forming apparatus 12 is an example of an electronic device. The image forming apparatus 12 is an example of an information processing apparatus that executes an on-premises workflow job. An information processing apparatus that executes an on-premises workflow job is not limited to the image forming apparatus 12, but examples of the information processing apparatus may include an output device such as a projector (PJ), an interactive whiteboard (IWB), or digital signage, a head-up display (HUD) device, industrial machinery, an imaging device, a sound collector, a medical device, a network home appliance, a laptop PC, a cellular phone, a smartphone, a tablet terminal, a video game console, a personal digital assistant (PDA), a digital camera, a wearable PC, and a desktop PC. The image forming apparatus 12 performs an on-premises workflow.

An on-premises workflow may be performed by using other devices than the image forming apparatus 12 connected to the network 18, such as the on-premises server 14. In addition, an on-premises workflow is linked to a cloud workflow. The on-premises server 14 is an FTP server or an SMB server that is used as a source of a file or a destination of a file.

The PC 13 is a terminal operated by a user viewing log information. The log information managed by the cloud workflow server 22 can be viewed with the PC 13 as described below. The PC 13 is simply an example, and instead of the PC 13, a cellular phone, a smartphone, a tablet terminal, a video game console, a PDA, or the like may be used. As will be described below, a user can also view the log information through the image forming apparatus 12.

The information processing system 1 is not limited to the configuration illustrated in FIG. 1. Further, FIG. 1 illustrates a case in which the single image forming apparatus 12 and the single PC 13 are deployed, but multiple image forming apparatuses 12 or multiple PCs 13 may be deployed in the user environment 10.

<Hardware Configuration>
<<Computer>>

Figure 2:
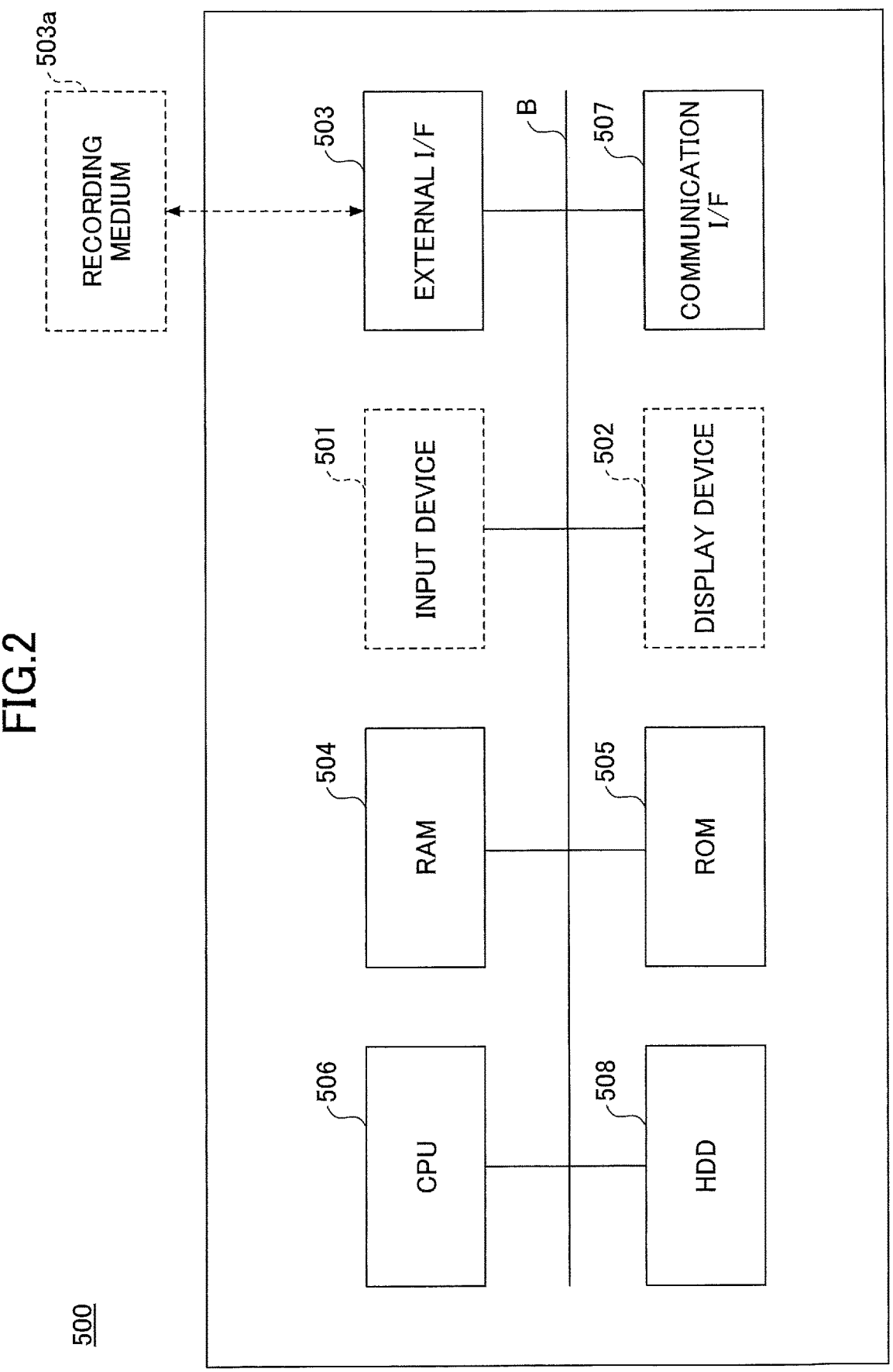
FIG. 2 is a hardware configuration diagram illustrating an example of a computer according to the embodiment.

The PC 13 is implemented, for example, by a computer 500 having a hardware configuration illustrated in FIG. 2. The on-premises server 14 and the cloud workflow server 22 are each implemented by the one or more computers having the hardware configuration illustrated in FIG. 2. FIG. 2 is an example of the hardware configuration diagram of the computer according to the present embodiment.

The computer 500 of FIG. 2 includes an input device 501, a display device 502, an external I/F (interface) 503, a RAM (Random Access Memory) 504, a ROM (Read Only Memory) 505, a CPU (Central Processing Unit) 506, a communication I/F 507, an HDD (Hard Disk Drive) 508, and the like, each of which is interconnected via a bus B. The input device 501 and the display device 502 may be connected and utilized when necessary.

The input device 501 may be a keyboard, a mouse, a touch panel, or the like, and may be used by a user to input various operation signals. The display device 502 may be a display or the like, and the display device 502 displays a result of processing by the computer 500.

The communication I/F 507 is an interface that connects the computer 500 to various networks. This allows the computer 500 to perform data communication via the communication I/F 507.

The HDD 508 is an example of a non-volatile storage device that stores programs and data. Examples of the stored programs and data include an operating system (OS), which is basic software for controlling an entirety of the computer 500, programs for providing various functions that run on the OS, and the like. Instead of the HDD 508, the computer 500 may use a drive device (e.g., a solid state drive (SSD)) that uses a flash memory as a storage medium.

The external I/F 503 is an interface with an external device. An example of the external device includes a recording medium 503a. This allows the computer 500 to read and/or write data from/to the recording medium 503a via the external I/F 503. Examples of the recording medium 503a include a flexible disk, a compact disc (CD), a digital versatile disc (DVD), a secure digital memory card (SD memory card) and a USB memory.

The ROM 505 is an example of a non-volatile semiconductor memory (storage device) that can retain programs and data even if the power is turned off. The ROM 505 stores programs and data such as a basic input/output program that is executed when the computer 500 starts up, OS setting information, and network setting information. The RAM 504 is an example of a volatile semiconductor memory (storage device) that temporarily retains programs and data.

The CPU 506 is an arithmetic processing device that realizes an overall control of the computer 500 and functions of the computer 500, by loading programs and data to the RAM 504, from the storage device such as the ROM 505 or the HDD 508, and by executing processing. For example, as the PC 13 in FIG. 1 has the hardware configuration illustrated in FIG. 2, the PC 13 can implement various processing as described below. Because each of the on-premises server 14 and the cloud workflow server 22 of FIG. 1 is configured by, for example, one or more computers each having the hardware configuration illustrated in FIG. 2, the on-premises server 14 and the cloud workflow server 22 can implement various processing as described below.

<<Image Forming Apparatus>>

Figure 3:
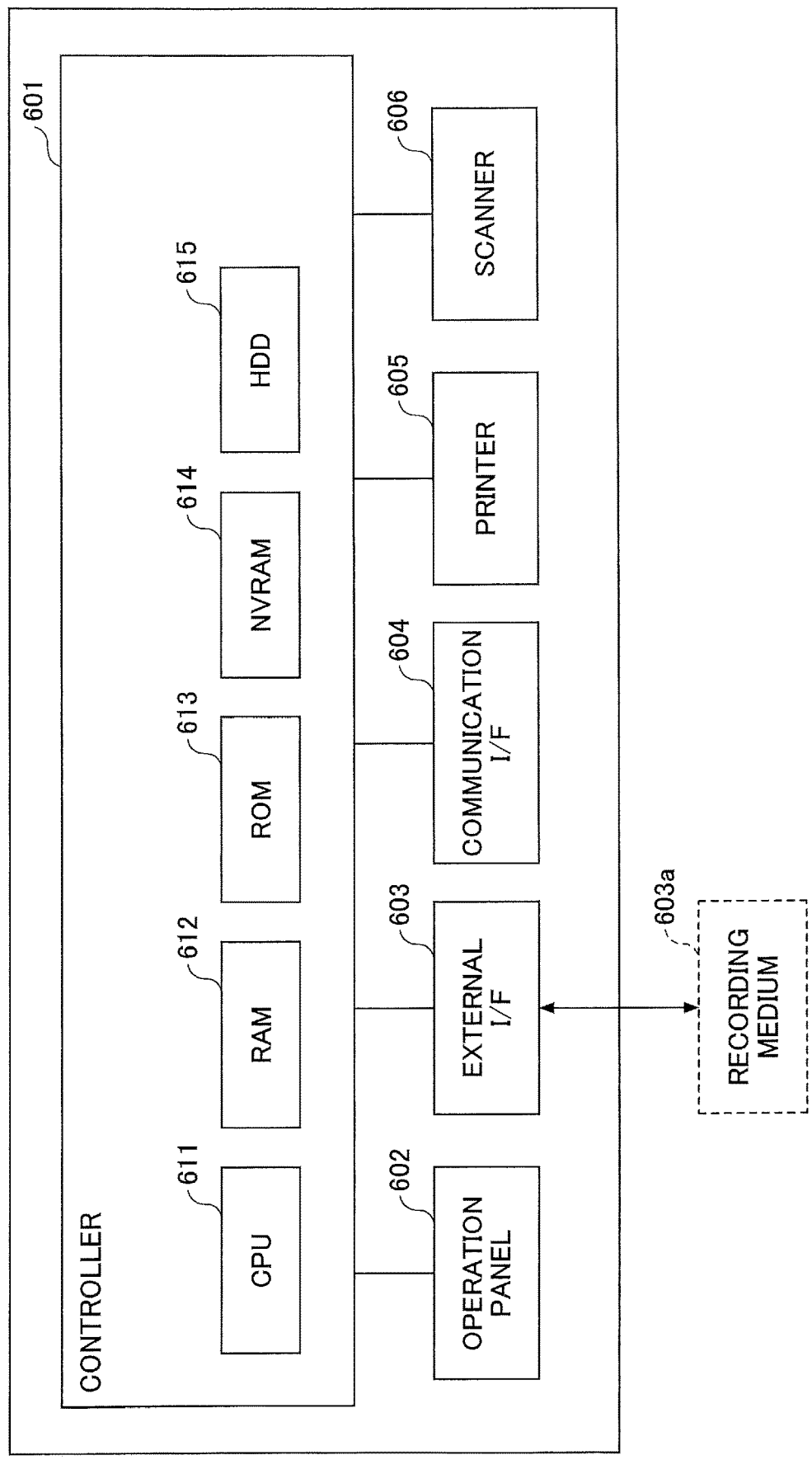
FIG. 3 is a hardware configuration diagram illustrating an example of an image forming apparatus according to the embodiment.

The image forming apparatus 12 of FIG. 1 is implemented by, for example, a computer having a hardware configuration illustrated in FIG. 3. FIG. 3 is a hardware configuration diagram of an example of the image forming apparatus according to the present embodiment. The image forming apparatus 12 of FIG. 3 includes a controller 601, an operation panel 602, an external I/F 603, a communication I/F 604, a printer 605, a scanner 606, and the like.

The controller 601 includes a CPU 611, a RAM 612, a ROM 613, an NVRAM 614, an HDD 615, and the like. The ROM 613 stores various programs and data. The RAM 612 temporarily retains programs and data. The NVRAM 614 stores, for example, setting information. The HDD 615 stores various programs and data.

The CPU 611 realizes an overall control and functions of the image forming apparatus 12, by loading programs, data, and setting information from the ROM 613, the NVRAM 614, the HDD 615, or the like to the RAM 612, and by performing processing.

The operation panel 602 includes an input portion for receiving input from a user, and a display portion for displaying. The external I/F 603 is an interface with an external device. An example of the external device includes a recording medium 603a. The image forming apparatus 12 can read and/or write data from/to the recording medium 603a through the external I/F 603. Examples of the recording medium 603a include an IC card, a flexible disk, a CD, a DVD, an SD memory card, and a USB memory.

The communication I/F 604 is an interface for connecting the image forming apparatus 12 to the network 18. Through the communication I/F 604, the image forming apparatus 12 can perform data communication. The printer 605 is a printing device for printing print data on paper. The scanner 606 is a reading device for reading image data (electronic data) from a paper document.

<Function Configuration>

Next, a functional configuration of the information processing system 1 according to the present embodiment will be described.

Figure 4:
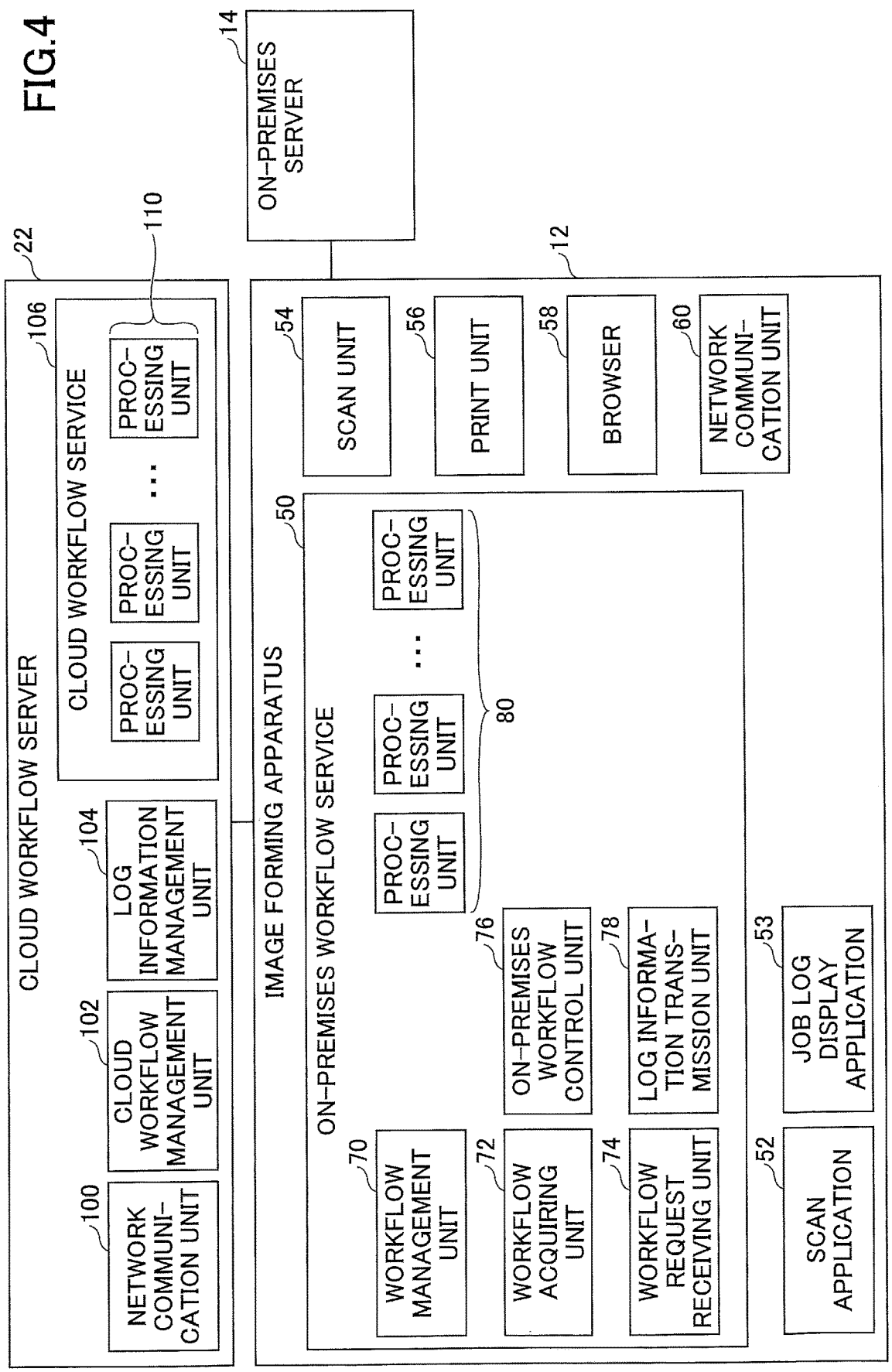
FIG. 4 is a functional configuration diagram illustrating an example of the information processing system according to the embodiment.

FIG. 4 is a functional configuration diagram of an example of the information processing system according to the present embodiment. In the functional configuration diagram of FIG. 4, illustration of the firewall 16, the network 18, the network 26, and the network 30 is omitted. The image forming apparatus 12 includes an on-premises workflow service 50, a scan application 52, a job log display application 53, a scan unit 54, a print unit 56, a browser 58, and a network communication unit 60.

The on-premises workflow service 50 includes a workflow management unit 70, a workflow acquiring unit 72, a workflow request receiving unit 74, an on-premises workflow control unit 76, a log information transmission unit 78, and one or more processing units 80.

The scan application 52 is an application related to document scanning. The scan application 52 may be an application program installed in the image forming apparatus 12, or may be a web application that can be used through the browser 58. The scan application 52 internally maintains an ID of an executable workflow. The scan application 52 has a user interface (UI) operable by a user, and means for job setup and job execution. For example, the scan application 52 may receive, from a user, settings of a scanner resolution, a reading size, color, and the like, an instruction of starting a scan job, or the like.

The job log display application 53 acquires log information (job log) of jobs managed by the cloud workflow server 22, and displays the log information on a job log screen that will be described below. The job log display application 53 has a user interface (UI) operable by a user, and functions such as a job logging acquisition function, a job log displaying function, and the like. The job log display application 53 may be implemented as a part of the function of the scan application 52.

The scan unit 54 is implemented by the scanner 606 and the like, and the scan unit 54 performs scanning. The print unit 56 is implemented by the printer 605 or the like, and the print unit 56 performs printing. The browser 58 provides a means for displaying a UI of the scan application 52, and means for job setting and job execution, in a case in which the scan application 52 is implemented as a web application. The network communication unit 60 performs network communication with the on-premises server 14 and the cloud workflow server 22.

The workflow management unit 70 of the on-premises workflow service 50 manages on-premises workflow information. The workflow acquiring unit 72 acquires the on-premises workflow information. The workflow request receiving unit 74 receives a workflow execution request from an application such as the scan application 52, and returns, as necessary, a result of execution of workflow to the application from which the request is issued, such as the scan application 52.

The on-premises workflow control unit 76 calls the processing units 80 in sequence according to the on-premises workflow information, to control execution of the on-premises workflow. The log information transmission unit 78 transmits log information of the on-premises workflow job to the cloud workflow server 22. Each of the processing units 80 performs processes in the user environment 10, such as an SMB transmission process and an FTP transmission process, in accordance with the control of the on-premises workflow execution controlled by the on-premises workflow control unit 76.

The cloud workflow server 22 includes a network communication unit 100, a cloud workflow management unit 102, a log information management unit 104, and a cloud workflow service 106. The network communication unit 100 performs network communication with the image forming apparatus 12 or the PC 13.

The cloud workflow management unit 102 calls processing units 110 of the cloud workflow service 106 in sequence according to the cloud workflow information, to control execution of the cloud workflow. The cloud workflow management unit 102 receives a request for execution of a cloud workflow job from the image forming apparatus 12, and returns a result of execution of the cloud workflow job to the image forming apparatus 12 from which the request is issued.

The log information management unit 104 issues a job identifier (ID) of an on-premises workflow job and a job ID of a cloud workflow job. The job ID is an example of identification information that is used for uniquely identifying a job among jobs executed in the information processing system 1. The log information management unit 104 manages a result of execution of the on-premises workflow job and a result of execution of the cloud workflow job.

The cloud workflow service 106 includes one or more of the processing units 110. Each of the processing units 110 executes the processing contents in the cloud environment 20 such as OCR processing, file conversion processing, and transmission processing to the storage service according to the workflow execution control by the cloud workflow management unit 102.

<Process Details>

Next, processes performed in the information processing system 1 according to the present embodiment will be described in detail. The first embodiment describes a case in which the on-premises workflow job and the cloud workflow job are executed independently.

<<Workflow Execution>>

Figure 5:
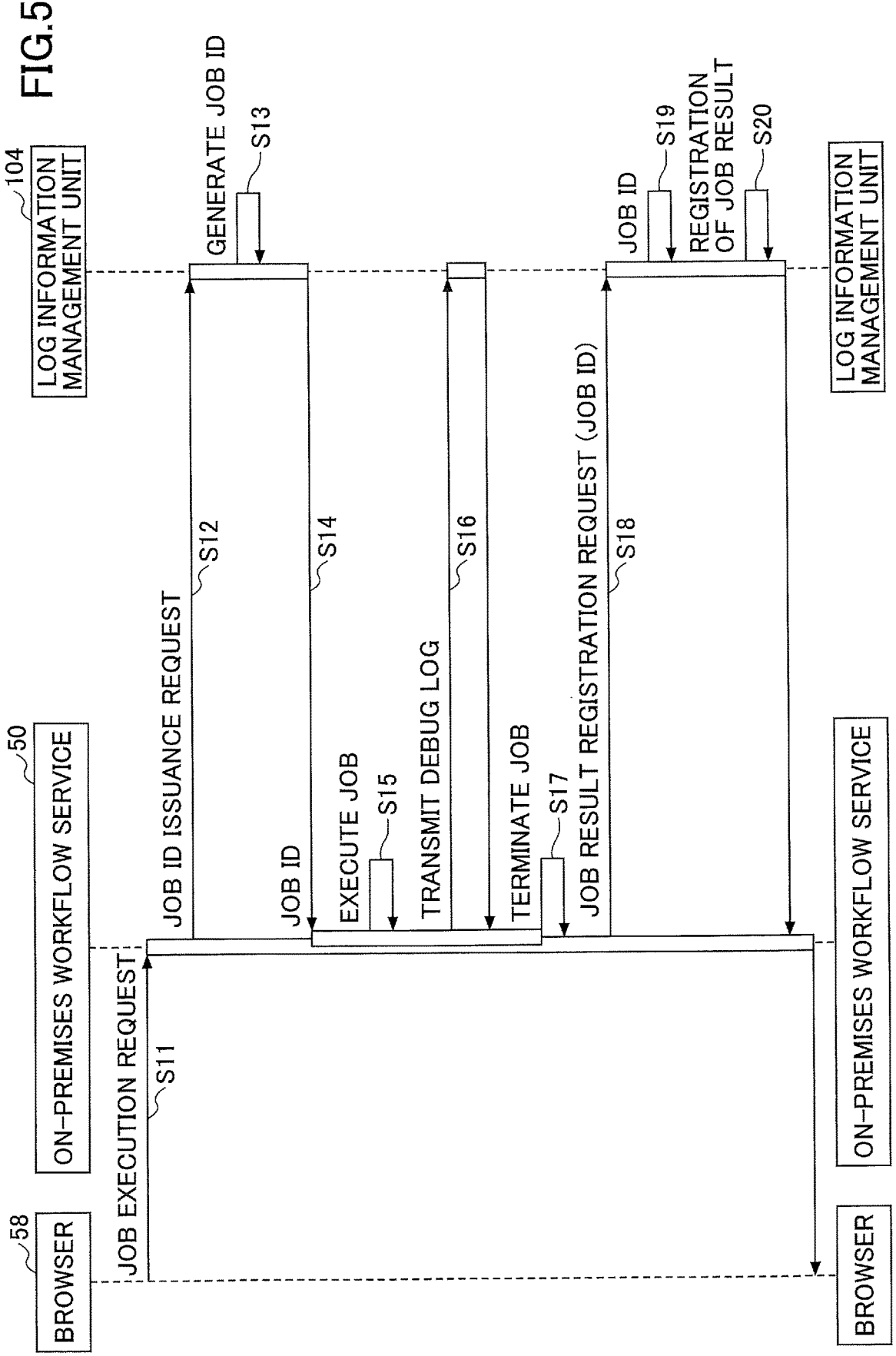
FIG. 5 is a sequence diagram illustrating an example in which an on-premises workflow job is executed in the information processing system according to the embodiment.

FIG. 5 is an example of a sequence diagram illustrating a case in which an on-premises workflow job is executed in the information processing system according to the present embodiment. In step S11, a web application running on the browser 58 transmits a job execution request to the on-premises workflow service 50. FIG. 5 illustrates an example in which the job execution request is issued from the web application running on the browser 58, but a job execution request may be issued from the scan application 52.

When the on-premises workflow service 50 receives the job execution request from the web application running on the browser 58, the on-premises workflow service 50 transmits, in step S12, a job ID issuance request to the log information management unit 104 of the cloud workflow server 22. In response to receiving the job ID issuance request, the log information management unit 104 generates a job ID in step S13. In step S14, the log information management unit 104 transmits the job ID generated in step S13 to the on-premises workflow service 50.

The on-premises workflow service 50 that has received the job ID executes an on-premises workflow job in step S15. After starting the execution of the on-premises workflow job in step S15, the on-premises workflow service 50 continues to transmit debug logs, which are used for analysis when failure has occurred, to the log information management unit 104 until the on-premises workflow job is terminated (step S16).

In step S17, the on-premises workflow service 50 terminates the on-premises workflow job. In step S18, the on-premises workflow service 50 transmits a job result registration request and a result of the on-premises workflow job, accompanied by designation of the job ID received in step S14, to the log information management unit 104.

In steps S19 to S20, the log information management unit 104 registers the job result received in step S18, by associating with the job ID issued in steps S13 and S14. When issuing a job ID in steps S13 and S14, if the identification information of the web application that sent the job execution request in step S11 has been registered, a job log screen on a per-web application basis can be displayed.

Figure 6:
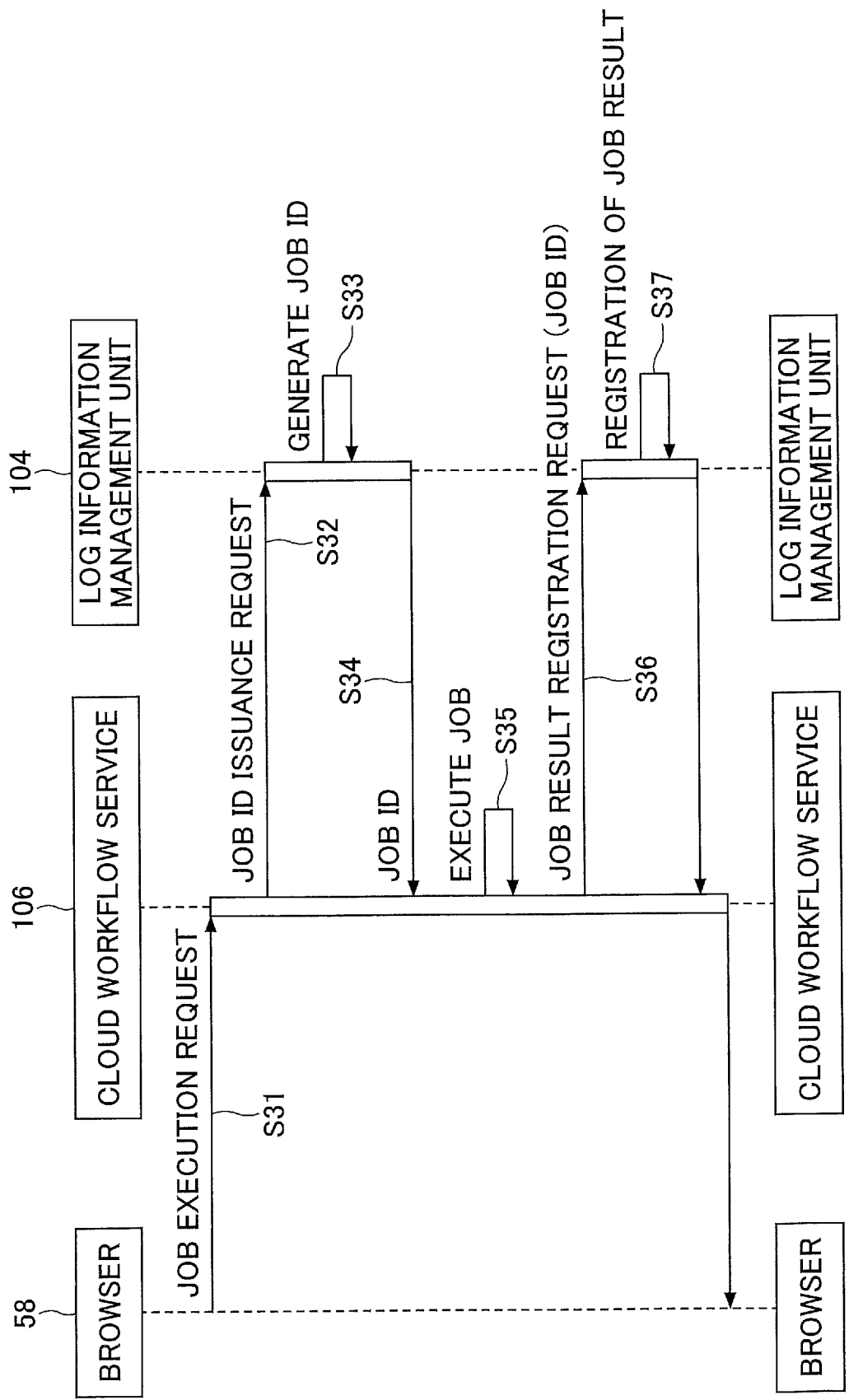
FIG. 6 is a sequence diagram illustrating an example in which a cloud workflow job is executed in the information processing system according to the embodiment.

FIG. 6 is an example of a sequence diagram illustrating a case in which a cloud workflow job is executed in the information processing system according to the present embodiment. In step S31, the web application running on the browser 58 transmits a job execution request to the cloud workflow service 106 of the cloud workflow server 22.

When the cloud workflow service 106 receives the job execution request from the web application running on the browser 58, the cloud workflow service 106 transmits a job ID issuance request to the log information management unit 104 (step S32). In response to receiving the job ID issuance request, the log information management unit 104 generates a job ID in step S33. In step S34, the log information management unit 104 transmits the job ID generated in step S33 to the cloud workflow service 106.

The cloud workflow service 106 that has received the job ID executes a cloud workflow job in step S35. After the cloud workflow job is completed, in step S36, the cloud workflow service 106 transmits a job result registration request and a result of the cloud workflow job, accompanied by designation of the job ID received in step S34, to the log information management unit 104.

In step S37, the log information management unit 104 registers the job result received in step S36 in association with the job ID issued in steps S33 and S34. The sequence diagram in FIG. 6 illustrates a case in which the cloud workflow service 106 receives the job execution request and transmits the job ID issuance request to the log information management unit 104. However, a process flow is not limited thereto. For example, the log information management unit 104 may receive a job execution request, and may transmit the job execution request to the cloud workflow service 106 after issuing an ID.

As described above, both a job log of the on-premises workflow job and a job log of the cloud workflow job are managed by the log information management unit 104 of the cloud workflow server 22.

<<Display of Job Log>>

Figure 7:
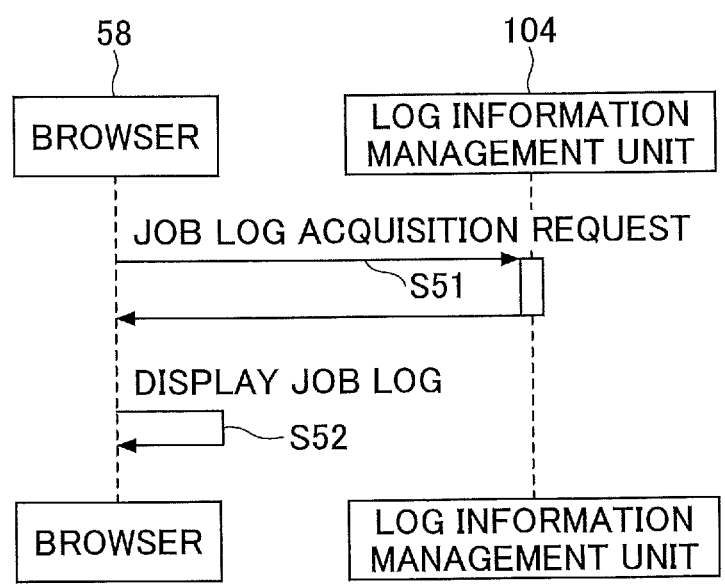
FIG. 7 is a sequence diagram of an example of a process of displaying a job log.

After the execution of a workflow illustrated in FIG. 5 or FIG. 6, a user can display an on-premises workflow job log or a cloud workflow job log according to a process illustrated in a sequence diagram of FIG. 7. FIG. 7 is a sequence diagram illustrating an example of a process of displaying a job log. In step S51, the web application running on the browser 58 issues (transmits) a job log acquisition request to the log information management unit 104 of the cloud workflow server 22. FIG. 7 illustrates an example in which the job log acquisition request is transmitted from the web application running on the browser 58. However, the job log display application 53 may issue a job log acquisition request to the log information management unit 104 and may display the job log on the display portion of the operation panel 602.

The log information management unit 104 transmits, to the browser 58, a job log corresponding to the received job log acquisition request. In step S52, the web application running on the browser 58 displays the job log received from the log information management unit 104, as illustrated in FIGS. 8 and 9 for example.

Figure 8:
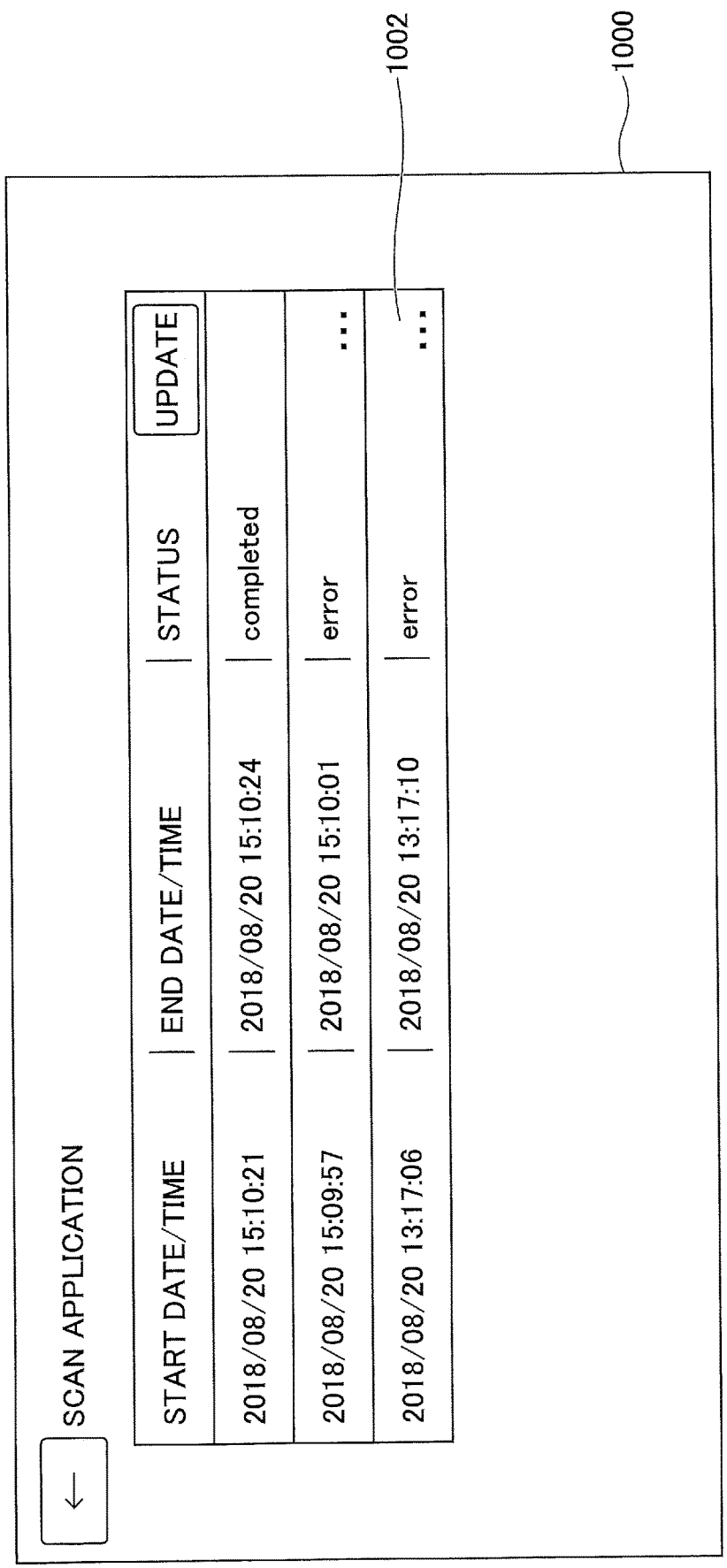
FIG. 8 is a diagram illustrating an example of a job log entries list screen.

FIG. 8 is a schematic view illustrating an example of a job log entries list screen 1000. The job log entries list screen 1000 illustrated in FIG. 8 displays a list of received job log entries. The job log entries list screen 1000 of FIG. 8 may display, for example, a list including job log entries corresponding to privilege of a user who has issued a job log acquisition request, or may display a list of job log entries related to the image forming apparatus 12 from which a job log acquisition request has been issued.

Further, by performing an operation of selecting one entry from the job log entries list screen 1000 of FIG. 8, a job log detail screen 1010 as illustrated in FIG. 9 is displayed for example. FIG. 9 is a schematic view illustrating an example of the job log detail screen. The job log detail screen 1010 of FIG. 9 illustrates a case in which a job log entry 1002 in the job log entries list screen 1000 of FIG. 8 has been selected. Detailed information of the job log entry 1002 displayed in the job log detail screen 1010 of FIG. 9 includes a job ID associated with the job log entry 1002.

Accordingly, because a user can recognize the job ID associated with the job log entry 1002 in the job log detail screen 1010 of FIG. 9, various inquiries can be made based on the job ID, such as inquiries about the details of errors.

The sequence diagram of FIG. 7 illustrates an example in which the job log acquisition request is transmitted from the browser 58 of the image forming apparatus 12 to the cloud workflow server 22. However, the job log acquisition request may be transmitted from a browser in the PC 13 to the cloud workflow server 22.

FIG. 10 is a configuration diagram illustrating an example of a job log managed by the log information management unit 104. The job log illustrated in FIG. 10 includes items of a job ID, an execution environment, a status, a start date/time, an end date/time, a serial number, and an error message. The job ID is an example of identification information that can uniquely identify a job log entry among job logs.

The execution environment is information that indicates whether the corresponding job log entry is for an on-premises workflow job or for a cloud workflow job. The status indicates a processing status of the job, such as "completed" and "error". The start date/time indicates date and time when the job was started. The end date/time indicates date and time when the job ended. The serial number is an example of identification information that can identify the image forming apparatus 12.

The error message is error information generated when the job fails, and no information is provided when the job is completed successfully or when the job is running. As illustrated in FIG. 10, the job log (job log entries) of the on-premises workflow and the job log (job log entries) of the cloud workflow are managed in a shared area (e.g., a table) by the log information management unit 104. Also, as illustrated in FIG. 10, the job log entries of jobs executed in different image forming apparatuses 12 are managed in the shared area by the log information management unit 104.

<<Displaying Debug Log>>

Figure 11:
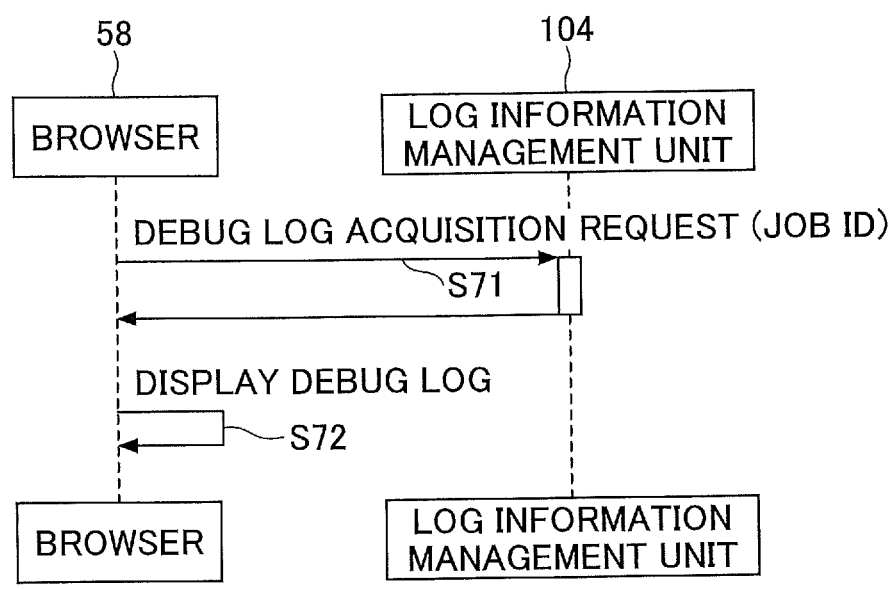
FIG. 11 is a sequence diagram illustrating an example of a process of displaying a debug log.

After the execution of a workflow illustrated in FIG. 5 or 6, a user can display a debug log of the on-premises workflow or the cloud workflow according to a process illustrated in a sequence diagram of FIG. 11. FIG. 11 is a sequence diagram illustrating an example of a process of displaying a debug log.

In step S71, the web application running on the browser 58 transmits a debug log acquisition request accompanied by designation of a job ID, to the log information management unit 104 of the cloud workflow server 22.

FIG. 11 illustrates an example in which the debug log acquisition request is transmitted from the web application running on the browser 58. However, the debug log acquisition request may be transmitted from the job log display application 53, or may be transmitted from a web application running on the browser in the PC 13.

The log information management unit 104 transmits, to the browser 58, a debug log corresponding to the job ID received with the debug log acquisition request. In step S72, the web application running on the browser 58 displays the debug log received from the log information management unit 104, as illustrated in FIG. 12 for example. FIG. 12 is a diagram illustrating an example of a structure of a debug log. Accordingly, a user such as a developer of the on-premises workflow service 50 or the cloud workflow service 106 can check a debug log corresponding to a job ID designated by the user.

(Conclusion)

According to the first embodiment, the cloud workflow job executed in the computer system of the cloud environment 20 and the on-premises workflow job executed in the computer system of the user environment 10 (which is in a different network environment from the cloud environment 20) can be uniquely managed in association with the job ID issued by the log information management unit 104. Accordingly, based on a job ID confirmed in the job log detail screen 1010, a user can perform various inquiries designating the corresponding job uniquely, such as inquiries about the details of errors.

Second Embodiment

In the first embodiment, an example in which an on-premises workflow job and a cloud workflow job are executed independently was described. A second embodiment describes an example in which an on-premises workflow job and a cloud workflow job are executed in coordination with each other. As a system configuration, a hardware configuration, and a functional configuration of an information processing system according to the second embodiment are the same as those of the first embodiment, the description thereof will be omitted accordingly.

Figure 13:
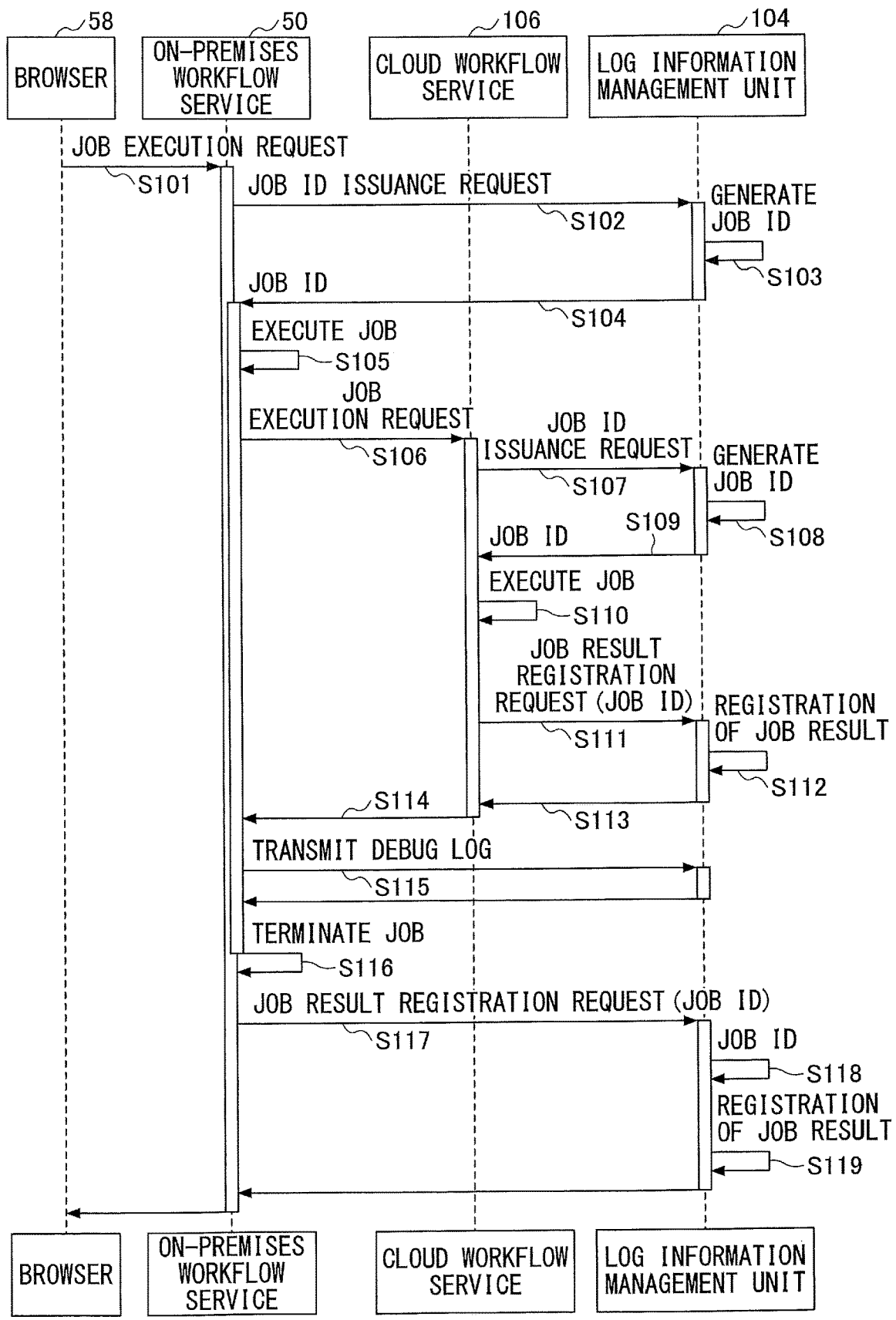
FIG. 13 is a sequence diagram illustrating an example in which the on-premises workflow job and the cloud workflow job are executed in cooperation with each other in the information processing system according to a second embodiment.

FIG. 13 is a sequence diagram illustrating an example in which an on-premises workflow job and a cloud workflow job are executed in coordination with each other in the information processing system according to the second embodiment. Because the sequence diagram of FIG. 13 contains same steps as those in the sequence diagram of the first embodiment, descriptions of the steps that are the same may be omitted accordingly.

In step S101, the web application running on the browser 58 transmits a job execution request to the on-premises workflow service 50. In response to receiving the job execution request from the web application running on the browser 58, in step S102, the on-premises workflow service 50 transmits a job ID issuance request to the log information management unit 104 of the cloud workflow server 22. In response to receiving the job ID issuance request, the log information management unit 104 generates a job ID for the on-premises workflow in step S103. In step S104, the log information management unit 104 transmits the job ID generated in step S103 to the on-premises workflow service 50.

When the on-premises workflow service 50 receives the job ID from the log information management unit 104, the on-premises workflow service 50 executes the on-premises workflow job in step S105. For example, it may be desirable that high-load processing such as OCR is performed in the cloud environment 20 having high processing performance. Thus, the sequence diagram of FIG. 13 illustrates an example of issuing a job execution request from the on-premises workflow service 50 to the cloud workflow service 106 during execution of the on-premises workflow job. The on-premises workflow service 50 transmits the job execution request to the cloud workflow service 106 of the cloud workflow server 22 in step S106.

When the cloud workflow service 106 receives the job execution request from the on-premises workflow service 50, the cloud workflow service 106 transmits a job ID issuance request to the log information management unit 104 in step S107. In response to receiving the job ID issuance request, the log information management unit 104 generates, in step S108, a job ID for the cloud workflow. In step S109, the log information management unit 104 transmits the job ID generated in step S108 to the cloud workflow service 106.

When the cloud workflow service 106 receives the job ID, the cloud workflow service 106 executes the cloud workflow job in step S110. After the cloud workflow job is completed, in step S111, the cloud workflow service 106 transmits a job result registration request and a result of the cloud workflow job accompanied by designation of the job ID received in step S109, to the log information management unit 104.

In step S112, the log information management unit 104 registers the result of the cloud workflow job received in step S111 in association with the job ID for the cloud workflow. In step S113, the cloud workflow service 106 receives a response of the job result registration request. In step S114, the on-premises workflow service 50 receives a response of the job execution request issued in step S106. The response of the job execution request includes the job ID (job ID issued in step S108) of the job executed in the cloud workflow service 106 in accordance with the job execution request issued in step S106.

After starting the execution of the on-premises workflow job in step S105, the on-premises workflow service 50 continues to transmit debug logs, which are used for analysis when failure has occurred, to the log information management unit 104 until the on-premises workflow job is terminated (step S115). In step S116, the on-premises workflow service 50 terminates the on-premises workflow job.

In step S117, the on-premises workflow service 50 transmits the job result registration request and a result of the on-premises workflow job, accompanied by designation of the job ID for the on-premises workflow received in step S104 and the job ID for the cloud workflow received in step S114, to the log information management unit 104.

In steps S118 to S119, the log information management unit 104 registers the result of the job received in step S117, in association with the job ID for the on-premises workflow and the job ID for the cloud workflow. As a result, a job log of the on-premises workflow job and a job log of the cloud workflow job that are executed in cooperation are associated with each other as illustrated in FIG. 14, and are managed by the log information management unit 104 of the cloud workflow server 22.

FIG. 14 is a configuration diagram illustrating an example of a job log managed by the log information management unit 104. The job log illustrated in FIG. 14 is configured such that an item of a dependent job ID is added to the items of the job log illustrated in FIG. 10. In a case in which a job is executed in coordination with another job, a job ID of the another job executed in coordination with the job is stored in the item of the dependent job ID. For example, in the sequence diagram of FIG. 13, a job ID of a cloud workflow job that performs processing in coordination with an on-premises workflow job is stored in the item of the dependent job ID. It should be noted jobs coordinating with each other are not limited to a set of an on-premises workflow job and a cloud workflow job. Further, more than two jobs may be performed in coordination with each other.

After the execution of the workflow illustrated in FIG. 13, a user can display a job log in accordance with the process illustrated in the sequence diagram of FIG. 7. However, in the second embodiment, although two jobs are executed: an on-premises workflow job and a cloud workflow job, from the perspective of a user who has requested job execution, only a single job execution is requested.

Therefore, it is desirable to display a job log of one of the on-premises workflow job and the cloud workflow job log in the job log entries list screen 1000 of FIG. 8, instead of displaying both the on-premises workflow job log and the cloud workflow job log. For example, it is preferable that the job log entries list screen 1000 of FIG. 8 displays the job log of the on-premises workflow that receives a job execution request from the web application running on the browser 58.

A workflow that receives a job execution request from the web application running on the browser 58 can be identified by, for example, referring to workflow information illustrated in FIG. 15. FIG. 15 is a configuration diagram illustrating an example of the workflow information. The workflow information illustrated in FIG. 15 stores information of a workflow whose job log is to be displayed, for each web application running on the browser 58.

(Conclusion)

According to the second embodiment, the on-premises workflow job and the cloud workflow job performed in coordination with each other can be uniquely managed in association with the job ID issued by the log information management unit 104. Accordingly, based on the job ID confirmed in the job log detail screen 1010, a user can perform various inquiries designating the corresponding job uniquely, such as inquiries about the details of errors.

The present invention is not limited to the above specifically disclosed embodiments, and various modifications and enhancements are possible without departing from the scope of the claims. For example, the configuration of the information processing system 1 illustrated in FIG. 1 is an example. The image forming apparatus 12 may be composed of multiple devices. For example, image forming apparatus 12 may be composed of a device that functions as an operation unit and a device that functions as a main body portion.

The cloud workflow service 106 is an example of a first job execution section. The on-premises workflow service 50 is an example of a second job execution section. The job log display application 53 is an example of a log information display unit.

Each of the functions of the above-described embodiments can be implemented by one or more processing circuits. Herein, a "processing circuit" includes a circuit programmed to perform each function by software, such as a processor implemented by electronic circuits, an ASIC (Application Specific Integrated Circuit) designed to perform each of the above-described functions, a DSP (Digital Signal Processor), an FPGA (field programmable gate array), or a conventional circuit module.

What is claimed is:

1. An information processing system comprising:
   a first information processing apparatus on a first network, the first information processing apparatus including at least one first processor and at least one first memory storing a log information management program and a first job execution program, the log information management program causing the first processor to execute a log information management process, and the first job execution program causing the first processor to execute a first job; and a second information processing apparatus on a second network different from the first network, the second information processing apparatus including a second processor and a second memory storing a second job execution program causing the second processor to execute a second job; wherein the information processing system is configured to perform a process including issuing, by the log information management process, first identification information to the first job, in response to receiving an identification information issuance request from the first job;

issuing, by the log information management process, second identification information to the second job, in response to receiving an identification information issuance request from the second job, the second identification information being different from the first identification information;

generating, by the first job, first log information;

adding, by the first job, the first identification information to the first log information;

transmitting, by the first job, the first log information to which the first identification information is added, to the log information management process;

generating, by the second job, second log information;

adding, by the second job, the second identification information to the second log information; and transmitting, by the second job, the second log information to which the second identification information is added, to the log information management process.

2. The information processing system according to claim 1, wherein, in a case in which the second job is executed in coordination with the first job, the second job is configured to add the first identification information to the second log information in addition to the second identification information, and to transmit the second log information to which the first identification information and the second identification information are added, to the log information management process.

3. The information processing system according to claim 1, the second memory further storing a program causing the second processor to perform a log information display process configured to receive, from the log information management process, log information to which identification information is added, and to display the log information.

4. The information processing system according to claim 3, wherein the log information display process is configured, in a case in which the second job is executed in coordination with the first job, to display either the first log information to which the first identification information is added or the second log information to which the second identification information is added.

5. The information processing system according to claim 1, wherein the first information processing apparatus includes a first computer and a second computer, each of the first computer and the second computer being connected to the first network and including a processor and a memory;

the log information management program is configured to be executed by the processor in the first computer; and the first job execution program is configured to be executed by the processor in the second computer.

6. An information processing apparatus on a first network, the information processing apparatus comprising:

at least one processor; and at least one memory storing a log information management program and a first job execution program, the log information management program causing the processor to execute a log information management process, and the first job execution program causing the processor to execute a first job; wherein the log information management process is configured to issue first identification information to the first job, in response to receiving an identification information issuance request from the first job, and to issue, second identification information to a second job executed in an external information processing apparatus on a second network different from the first network, in response to receiving an identification information issuance request from the second job, the second identification information being different from the first identification information; and the first job is configured to add the first identification information to log information of the first job, to transmit the log information to which the first identification information is added, to the log information management process.

7. The information processing apparatus according to claim 6, wherein the information processing apparatus includes a first computer and a second computer, each of the first computer and the second computer being connected to the first network and including a processor and a memory;

the log information management program is configured to be executed by the processor in the first computer; and the first job execution program is configured to be executed by the processor in the second computer.

8. A method of managing log information performed by an information processing system including a first information processing apparatus on a first network and a second information processing apparatus on a second network different from the first network, the first information processing apparatus and the second information processing apparatus being configured to perform a first job and a second job respectively, the method comprising:

issuing, by the first information processing apparatus, first identification information to the first job, in response to receiving an identification information issuance request from the first job;

issuing, by the first information processing apparatus, second identification information to the second job, in response to receiving an identification information issuance request from the second job, the second identification information being different from the first identification information;

generating, by the first information processing apparatus, first log information of the first job;

adding, by the first information processing apparatus, the first identification information to the first log information;

storing, by the first information processing apparatus, the first log information to which the first identification information is added;

generating, by the second information processing apparatus, second log information of the second job;

adding, by the second information processing apparatus, the second identification information to the second log information; and transmitting, by the second information processing apparatus, the second log information to which the second identification information is added, to the first information processing apparatus.

\* \* \* \* \*